(12) United States Patent
Katz et al.

(10) Patent No.: US 6,876,455 B1
(45) Date of Patent: Apr. 5, 2005

(54) METHOD AND APPARATUS FOR BROADBAND OPTICAL END POINT DETERMINATION FOR IN-SITU FILM THICKNESS MEASUREMENT

(75) Inventors: Vladimir Katz, Fremont, CA (US); Bella Mitchell, Antioch, CA (US)

(73) Assignee: Lam Research Corporation, Fremont, CA (US)

( * ) Notice: Subject to any disclaimer, the term of this patent is extended or adjusted under 35 U.S.C. 154(b) by 224 days.

(21) Appl. No.: 10/210,921

(22) Filed: Aug. 1, 2002

(51) Int. Cl.[7] .............................................. G01B 11/02
(52) U.S. Cl. .................................................... 356/503
(58) Field of Search ................................ 356/485, 492, 356/503, 504, 497, 498; 250/599.27

(56) References Cited

U.S. PATENT DOCUMENTS

| | | |
|---|---|---|
| 4,680,084 A | 7/1987 | Heimann et al. |
| 5,440,141 A * | 8/1995 | Horie .......................... 356/504 |
| 6,275,297 B1 * | 8/2001 | Zalicki ........................ 356/504 |

* cited by examiner

*Primary Examiner*—Samuel A. Turner
(74) *Attorney, Agent, or Firm*—Martine Penilla & Gencarella, LLP

(57) ABSTRACT

A method for determining a film thickness in a semiconductor substrate is provided. The method initiates with providing multiple layers on the semiconductor substrate. Then, two reflectance spectra are generated where each of the two reflectance spectra are associated with different time periods while an upper layer is being removed. Next, a difference between the two reflectance spectra is calculated. Then, a curve is defined from the difference between the two reflectance spectra. Next, the defined curve is fitted by a known parametric function to determine the film thickness. An endpoint detector and a CMP system are also provided.

19 Claims, 6 Drawing Sheets

METHOD AND APPARATUS FOR BROADBAND OPTICAL END POINT DETERMINATION FOR IN-SITU FILM THICKNESS MEASUREMENT

BACKGROUND OF THE INVENTION

The invention relates generally to semiconductor fabrication and more specifically to in-situ film thickness measurement for thin films deposited on a semiconductor substrate utilizing broad band spectrometry.

During semiconductor fabrication there are multiple steps where an underlying substrate is subjected to the formation and removal of various layers. The small feature sizes and tight surface planarity requirements, combined with the constant quest to increase throughput, makes it highly desirable to stop the process when the correct thickness has been achieved, i.e., when an endpoint has been obtained for the process step.

Present optical end point detection (EPD) methods make use of Broad Band Visible Spectra Spectrometry. The light of a lamp flash, i.e., shot, is returned from a wafer while an upper film is removed through a chemical mechanical planarization (CMP) or etch process. The light spectrum returned is measured for each shot and analyzed according to a programmed algorithm. For many multilayer transparent thin film structures, such as films associated with shallow trench isolation (STI) applications, the reflectance from the silicon substrate, is much greater then from upper layer film interfaces. Accordingly, the underlying silicon provides the main contribution in observed reflectance spectra. For instance, for a STI structure the reflectance from the silicon (Si) substrate surface, created at prior technological step trenches provides the main contribution in total reflectance. As a result, the reflectance spectra changes related to the layer of interest, i.e., the upper layer, are relatively small from shot to shot even at the moment when upper layer is fully removed. Therefore, EPD methods based on detecting the transition from one layer to the next underlying layer are not efficient enough when dealing with these thin transparent films encountered during upper layer removal processes. In such cases the method of direct measurement of the film thickness based on broadband visible spectrometry is preferred. For transparent films the measured spectra are the result of complex interference of light reflected from the wafer surface and deeper layers of the wafer, and the light scattered back from interlayer material. To obtain film thickness from these complicated spectra, Fourier transform and simulation spectra methods are typically used. One skilled in the art will appreciate that Fourier transform expends the complex spectrum on periodic terms. Peak locations in Fourier transform spectrum allow to restore film thickness of the layers in a stack. This method is applicable to relatively thick films. The periodic term corresponding to the film thickness should have enough repetitions in the measured spectrum so that peaks will be well separated and distinguished. However, when the spectrometer measurement band is 300 nanometers–700 nanometers, this method is inadequate for measuring the thickness of a layer that is less then about 300–600 of a nanometer (nm).

The simulation spectra methods are based on a multiparametric model where the thickness of layers, reflectance of interlayer boundaries and other characteristics of the structure taken as parameters. The multiparametric model disadvantages include high sensitivity of the approximation to precise values of introduced parameters and existence of numeral, very close fittings with completely different sets of fitting parameters. This uncertainty, increases with the number of terms and parameters in the fitting model. In addition, the above described methods are ineffective for layer thickness measurement if reflectance of the layer surfaces is only small part of total reflectance, such as the upper layer in an STI structure. That is, the thickness of the layer can not be extracted from such a spectrum because of the dominance of the reflectance from silicon and multiple unknown parameters.

In view of the foregoing, there is a need to provide a method and system to measure the thickness of layers deposited on a semiconductor substrate through broadband visible spectrometry irrespective of the contribution of the reflectance of the layer surface to the total reflectance.

SUMMARY OF THE INVENTION

Broadly speaking, the present invention fills these needs by providing a method and system that considers the differences between multiple shots to discard reflectance spectra contribution that does not change from shot to shot to reduce the number of parameters. It should be appreciated that the present invention can be implemented in numerous ways, including as an apparatus, a system, a device, or a method. Several inventive embodiments of the present invention are described below.

In accordance with one embodiment of the present invention, a method for determining a film thickness in a semiconductor substrate is provided. The method initiates with providing multiple layers on the semiconductor substrate. Then, two reflectance spectra are generated where each of the two reflectance spectra are associated with different time periods. Next, a difference between the two reflectance spectra is calculated. Then, a curve is defined from the difference between the two reflectance spectra. Next, the defined curve is fitted to a best fitting solution to determine the film thickness.

In another embodiment, an endpoint detection system is provided. The endpoint detection system includes a detector. The detector includes an emitter for generating an intensity of light and a receiver for measuring a reflected light spectrum from the generated intensity of light. The endpoint detection system also includes a controller in communication with the detector. The controller is configured to generate a curve corresponding to the reflected light spectrum. Additionally, the controller is configured to execute a best fitting algorithm to generate a curve corresponding to the reflected light spectrum.

In accordance with yet another embodiment of the present invention, a chemical mechanical planarization (CMP) system is provided. The system includes a polishing surface having a window defined therethrough. A carrier configured to support a semiconductor substrate is included. The carrier is further configured to force a surface of the semiconductor substrate against the polishing surface. An endpoint detector disposed below an underside of the polishing surface is included. The endpoint detector is configured to receive a reflected light signal from the surface of the semiconductor substrate. The endpoint detector includes an emitter for generating an intensity of light and a receiver for measuring a reflected light spectrum from the intensity of light. The system includes a controller in communication with the end point detector. The controller is configured to generate a curve corresponding to the reflected light spectrum by best fitting criterion.

It is to be understood that the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate exemplary embodiments of the invention and together with the description serve to explain the principles of the invention.

DETAILED DESCRIPTION OF THE PREFERRED EMBODIMENTS

Several exemplary embodiments of the invention will now be described in detail with reference to the accompanying drawings. It should be appreciated that like numerals represent like structures.

The embodiments described herein propose a method and apparatus which allows for the reliable measurement the thickness of thin films, which in turn can be used for endpoint determination. It should be appreciated that while the embodiments described herein allow for the measurement of films having a thickness that is less than about 600 nanometers (nm), the embodiments are also effective for measuring films having a thickness of 600 nm or more. In one embodiment, the method and apparatus use the dominant reflectance of silicon to determine a trench depth in a silicon substrate as the upper layers are planarized or etched.

Processes, such as chemical mechanical planarization (CMP) or etch processes deal not with a single spectrum but with series of spectra corresponding to the decreasing thickness of the upper layer. These spectra could be used together to extract low components from reflected spectra signal corresponding to layers of interest, such as an upper layer in one embodiment. Additionally, the spectra can be used together to decrease system noise, decrease the number of parameters in the fitting model and consequently increase reliability of measurement results.

The reflectance spectra $R(v)$ consists of N reflectances measured at different wave numbers $v_i$, $i=1,2, \ldots N$ and $v_1 < V_2 < \ldots < V_N$, thus $R(v) = \{R(v_1), R(V_2), \ldots R(v_N)\}$, where wave number $v = 1/\lambda$, $\lambda$ is a wave length.

The trench depth measurement presents reflectance R in a form dependent on one parameter $d_0$, which is the distance between the top and the bottom of a trench in a Si substrate. In one embodiment, the dominant reflecting surfaces is the trench in the Si substrate. This property is mathematically represented by the function: $R(v,d_0) = c + b*\cos(2\pi*2n_0*d_0*v) + \epsilon(v)$ where $n_0$ is the refractive index of silicon oxide filled up the trench, b and c are coefficients, and $\epsilon(v)$ is a small contribution of other layers' interference to the reflectance spectra.

Assuming $\epsilon(v)$ is negligible, then the real reflectance spectra can be expressed as $R(v,d_0) \approx c + b*\cos(2\pi*2n_0*d_0*v)$. Considering $C \approx \Sigma_{i=1, \ldots, N} R(v_i, d_0)/N$, which is the average reflectance level. Coefficient b depends on do and can be mathematically represented as $b = \{\Sigma_{i=1, \ldots, N} [R(v_i, d_0) - c]^2\} / \{\Sigma_{i=1, \ldots, N} \cos^2(2\pi*2n_0*d_0*v_i)\}$. Parameter $d_0$ is found from the best fitting of $R(v,d_0)$ according to minimum squares criterion.

Figure 1:
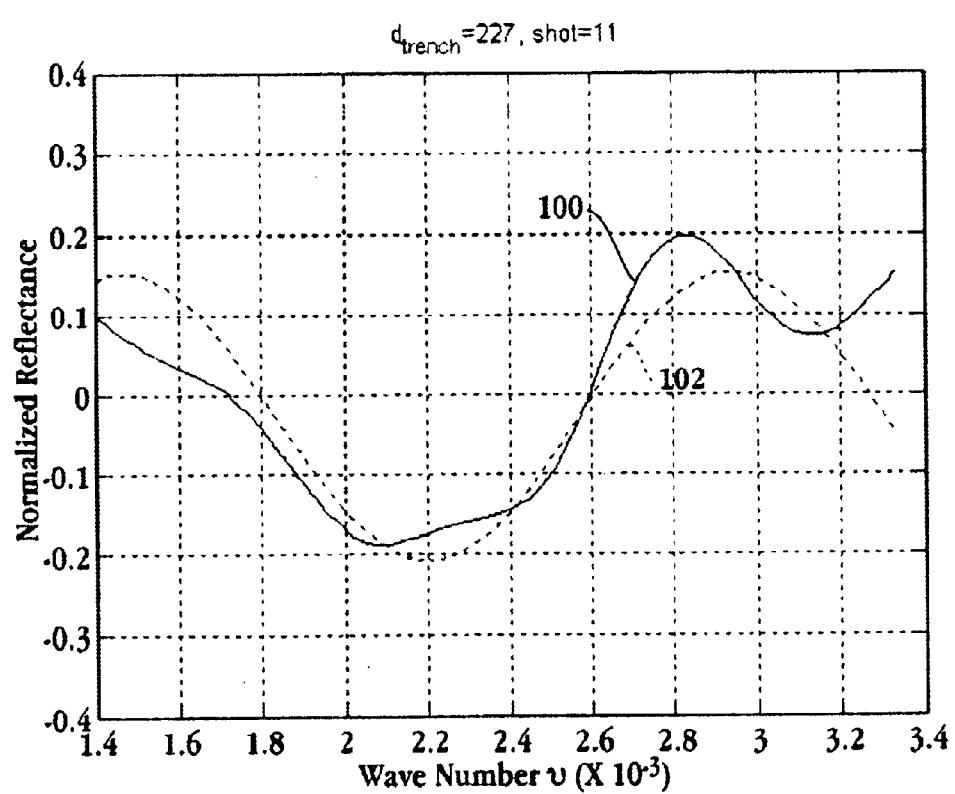
FIG. 1 is a graph of the wave number versus the normalized amplitude for curves representing the reflectance spectrum and the best fitting for the reflectance spectrum for a single shot in accordance with one embodiment of the invention.

FIG. 1 is a graph of the wave number versus the normalized reflectance spectrum and the best fitting for the reflectance spectrum for a single shot in accordance with one embodiment of the invention. Solid line 100 represents the reflectance spectrum from shot 11 and dotted line 102 represents the best fitting to solid line 100. As will be explained in more detail below, the trench depth is easily ascertained once the best fitting is identified, since the multiple parameters needed to determine the trench depth are all found from the best fitting curve. The trench depth associated with the best fitting curve of FIG. 1 is 227 nm. Consequently, the trench depth $(d_{trench}) = d_0 = 227$ nm provides an adequate estimation of the trench depth.

Figure 2:
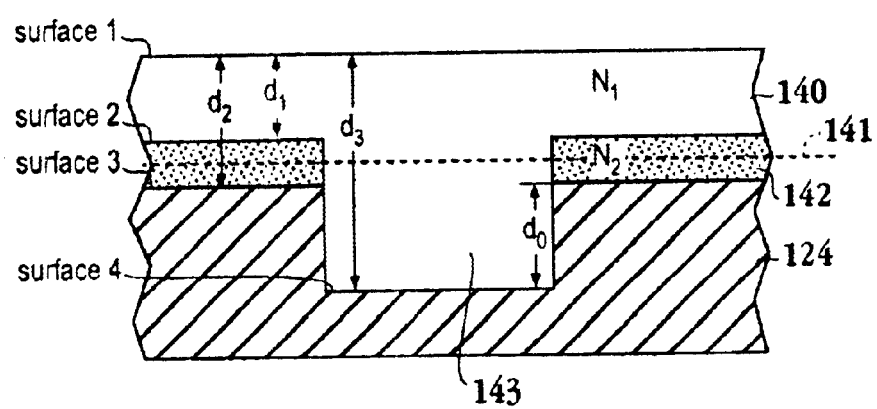
FIG. 2 is a simplified schematic diagram of a multilayer transparent film structure on a semiconductor substrate in accordance with one embodiment of the invention.

It should be appreciated that the trench depth (do) stays the same for each shot as the layers above the trench are being removed as shown with reference to FIG. 2. The intensity of the reflectance spectra is strong, as the silicon layer is not transparent as the films disposed over the silicon substrate can be. The reflected spectrum is plotted as shown in FIG. 1 and a known cosine based curve is fitted to find a best fit curve. The known cosine based curve is associated with a trench depth that approximates the trench depth for the reflected spectrum. Thus, the trench depth is ascertained from one shot in this embodiment.

In one embodiment of the invention, the difficulties related to restoration of the thickness of layers from the reflectance spectra is overcome by considering the differences between spectra of different shots rather than restoring the spectra themselves. In this manner, the contribution that does not change from shot to shot is discarded, such as interference between inner layer boundaries. The information of interest, such as upper layer thickness can be extracted by analyzing the difference between spectra of different shots as described in the mathematical models below. As a result of analyzing the differences, the number of parameters in the mathematical model is significantly decreased and the part of spectra corresponding to the upper layer can be extracted.

FIG. 2 is a simplified schematic diagram of a multilayer transparent film structure on a semiconductor substrate in accordance with one embodiment of the invention. Layer 140 is disposed over layer 142. Layer 142 is disposed over substrate 124. In one embodiment, layers 140 and 142 are transparent films. Trench 143 is defined within semiconductor substrate 124. In one embodiment, with respect to STI technology, layer 140 is an oxide layer, such as silicon oxide and layer 142 is a nitride layer, such as silicon nitride. As is generally known with STI technology, top layer 140 is planarized along with a portion of layer 142. Therefore, the trench depth, do, does not change. Thus, after a planarization process a portion of layer 142, depicted by line 141, remains. As mentioned above, the contribution to the spectra from interference between surfaces 2 and 3 can be removed by calculating the difference between two shots taken at different time points during the planarization process as layer 140 is being removed and as layer 142 is partially removed.

The process of simplifying the mathematical model when considering the difference between two shots during the planarization or etch process is discussed below. While the process is explained for any number of layers on a substrate, reference can be made to FIG. 2, which depicts a substrate having a step structure, i.e., layers 140 over 142; over substrate 124; and layer 140 filled into trench 143 of substrate 124. Distances in the function below, denoted by $d_1, d_2, \ldots, d_k$, represent the distances between upper surface 1 and 2, 3, . . . ,k+1-th underlying surfaces. Indices of refraction denoted by $n_1, n_2, \ldots, n_k$—and correspond to the 1st, 2nd, . . . ,k-th layer, respectively. Thus, reflectance R is mathematically represented by:

$$R(v, d_1) = a_0 + a_1 * \cos[2*\pi*2(n_1*d_1+\alpha_1)*v] + a_2*\cos[2*\pi*2(n_1*d_1+\alpha_2)*v] + \ldots + a_k*\cos[2*\pi*2(n_1*d_1+\alpha_k)*v].$$

The term $a_0$, which does not change with decreasing thickness of the upper layer, includes average reflectance level and all terms corresponding to interference between inner boundaries. The other terms of the above function are interference terms between the upper surface and underlying boundaries, where $a_1, a_2, \ldots, a_k$ are coefficients representing the weight of the corresponding interference term. One skilled in the art will appreciate that v is the wave number and $v=1/\lambda$, where $\lambda$ is the wavelength.

The expression $1_j = n_1 * d_1 + \alpha_j$ (j=1, . . . ,k) of the above function represents the optical path, $1_j$, between the upper surface and underlying j-th surface.

For instance, the optical path $1_2$ (FIG. 2) is equal to:

$$1_2 = n_1 * d_1 + n_2 (d_2 - d_1)$$

therefore, $\alpha_2 = n_2 (d_2 - d_1)$.

If, in a process such as CMP, the thickness of the upper layer reduces by a value of $\Delta$ then reflectance R changes to expression:

$$R(v, d_1-\Delta) = a_0 + a_1 * \cos[2*\pi*2(n_1*(d_1-\Delta)+\alpha_1)*v] + a_2*\cos[2*\pi*2(n_1*(d_1-\Delta)+\alpha_2)*v] + \ldots + a_k*\cos[2*\pi*2(n_1*(d_1-\Delta)+\alpha_k)*v].$$

It should be appreciated that changes in values of coefficients related to a change in absorption of the upper layer are negligible and are disregarded. The spectra difference then becomes:

$$S(v, d_1)) = R(v, d_1 - \Delta) - R(v, d_1) = \sum_{j=1}^{k} a_j *$$
$$\{\cos[2*\pi*2(n_1*(d_1 - \Delta) + \alpha_j)*v] - \cos[2*\pi*2(n_1*d_1 + \alpha_j)*v]\}.$$

The term $a_0$, which is suppressing part of the reflectance and contains some of the unknown characteristics of the inner layers, cancels when the differences are considered. The spectra difference can be transformed to a more convenient form using the trigonometric identity $\cos \alpha - \cos \beta = 2 \sin \{(\beta-\alpha)/2\} * \sin \{(\alpha+\beta)/2\}$:

$$S(v, d_1) = \sum_{j=1}^{k} 2a_j * \sin(2*\pi*2n_1*\Delta/2*v) * \sin[2*\pi*2(n_1*d_1 + \alpha_j - n_1*\Delta/2)*v]$$

$$= 2 * \sin(2*\pi*2n_1*\Delta/2*v) * \sum_{j=1}^{k} a_j * \sin[2*\pi*2(n_1*d_1 + \alpha_j - n_1*\Delta/2)*v].$$

The removed thickness, $\Delta$, between close shots is small. That is, $\Delta \ll d_1$. Therefore, $S(v,d_1)$ is reduced to the expression:

$$S(v, d_1) \approx 2 * \sin(2*\pi*n_1*\Delta*v) * \sum_{j=1}^{k} a_j * \sin[2*\pi*2(n_1*d_1 + \alpha_j)*v].$$

Due to present system configuration, factor $2*\sin(2*\pi*n_1*\Delta*v)$ does not have practical impact on the algorithm output, and will be disregarded in further discussion.

It should be appreciated that the above function has less terms and can be effectively used for fitting real reflectance spectra to obtain the thickness of film layers in the structure. The fitting function, i.e., the above expression for $S(v,d_1)$ has two k-parameters $a_j$ and $\alpha_j$, where j=1, . . . ,k, that are common for all shots until the time when layer 140 is removed completely.

For exemplary purposes, the efficiency of using the spectra difference method described herein is shown on the thickness measurement of the upper layers of a STI structure in CMP process. For this example, the STI structure includes four surfaces and, in turn, spectra difference $S(v, d_1)$ includes interference of the upper surface with three underlying surfaces, i.e., k=3. To approximate the spectra difference the above function is simplified to the form:

$$S(v, d_1) \approx a_1 * \sin[2*\pi*2(d1*n_1+\alpha_1)*v] + a_2*\sin[2*\pi*2(d1*n_1+\alpha_2)*v] + a_3*\sin[2*\pi*2(d1n_1+\alpha_3)*v].$$

where $\alpha_1 = 0$; $\alpha_2 = n_2*(d_2-d_1)$; $\alpha_3 = n_1*(d_3-d_1)$. Amplitudes of terms are considered equal, i.e., $a_1 = a_1$, $= a_2 = a_3$, so a is normalizing coefficient. As a matter of fact, measuring the trench oxide during CMP removal is of interest to determine the end point of the CMP removal. Therefore, the above expression is rewritten as a function of trench oxide-$d_3$. Denoting the thickness of layer 142 as $d_N$, we obtain:

$$S(v,d_3) \approx a\{*\sin[2*\pi*2(n_1d_3-n_1d_0-n_1d_N)*v]+\sin[2*\pi*2(n_1*d_3-n_1d_0-n_1d_N+n_2d_N)*v]+\sin(2*\pi*2d_3*n_1*v)\}$$

Continuing with the above example the spectra difference is considered between shots j+h and shot j with h=3: $S_j=R_{j+h}-R_j$, where j=1, 2, . . . that is, the number of the shot.

Figure 3A:
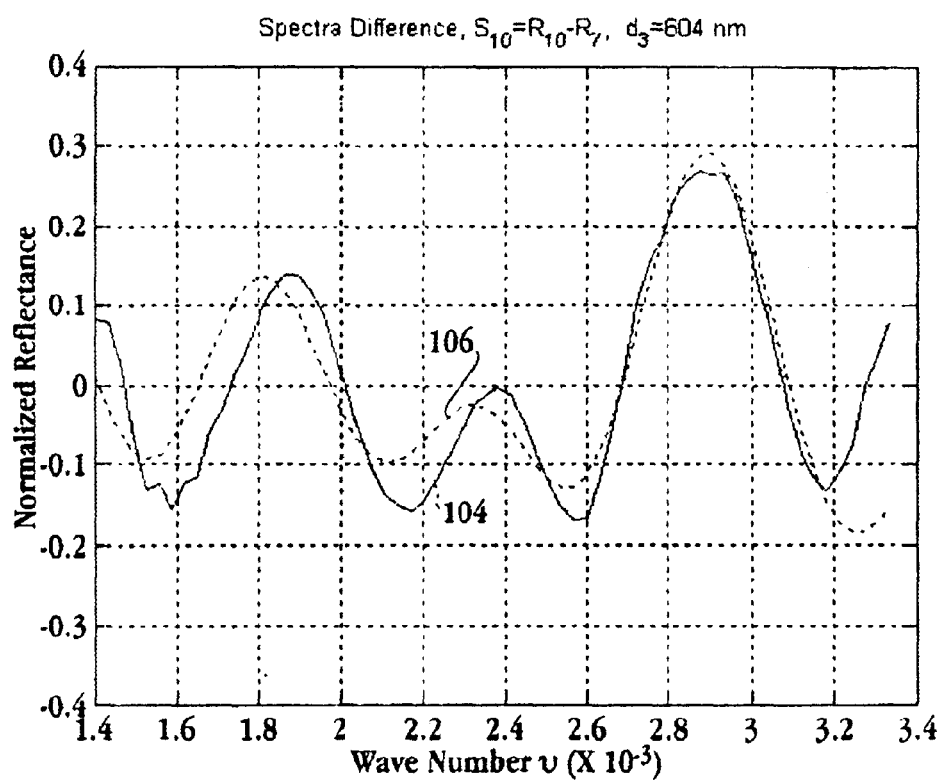
FIG. 3A and FIG. 3B are graphs illustrating spectra fitting for a decreasing thickness during a CMP process in accordance with one embodiment of the invention.
Figure 3B:
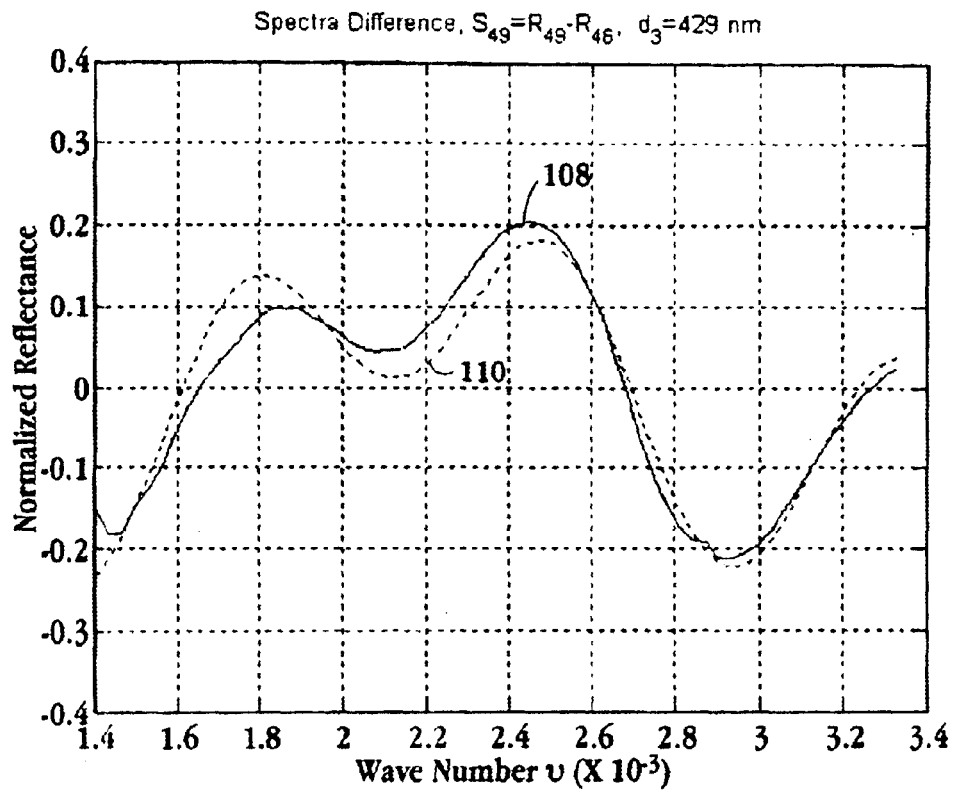

FIG. 3A and FIG. 3B are graphs illustrating spectra fitting for a decreasing thickness during a CMP process in accordance with one embodiment of the invention.

FIG. 3A represents the spectra difference using the above described function between shot 10 and shot 7 of one exemplary process. Curve 104 of FIG. 3A is a real reflectance spectra difference between shots 10 and 7. Curve 106 of FIG. 3A is a best fitting to real spectra, from which trench oxide thickness $d_3$ has been calculated, where $d_{3=604}$ nm.

For FIG. 3B, Curve 108 is a real reflectance spectra difference between shots 49 and 46. Curve 110 of FIG. 3B is a best fitting to real spectra, from which trench oxide thickness $d_3$ has been calculated where $d_3=429$ nm. It should be appreciated that curves 106 and 110 are generated by a controller executing a best fitting algorithm in one embodiment of the invention.

Figure 4:
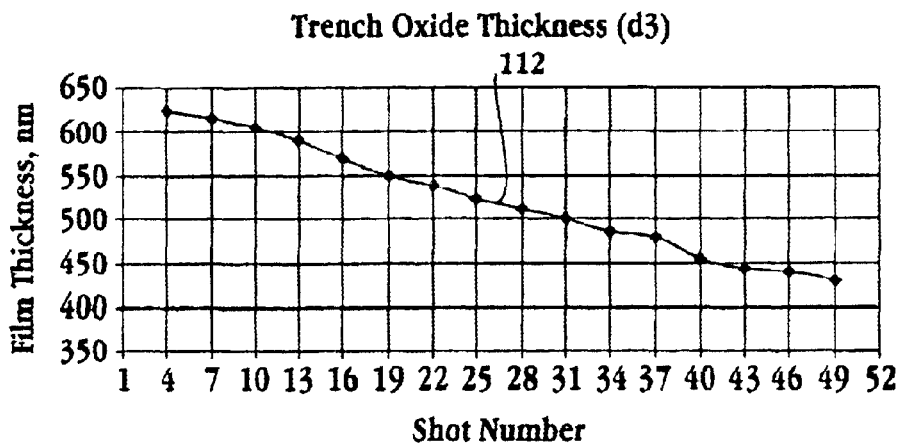
FIG. 4 is a graph representing the decrease of a film thickness from shot to shot of an oxide layer that is less than about 600 nanometers thick in accordance with one embodiment of the invention.

FIG. 4 is a graph representing the decrease of a film thickness from shot to shot of an oxide layer that is less than about 600 nanometers thick in accordance with one embodiment of the invention. It should be appreciated that the thickness of the film of the semiconductor substrate is being decreased by a layer removal process, such as a CMP or an etch process. Thus, the substantially linear reduction of the thickness of a thin transparent film, such as an oxide layer is captured.

Figure 5:
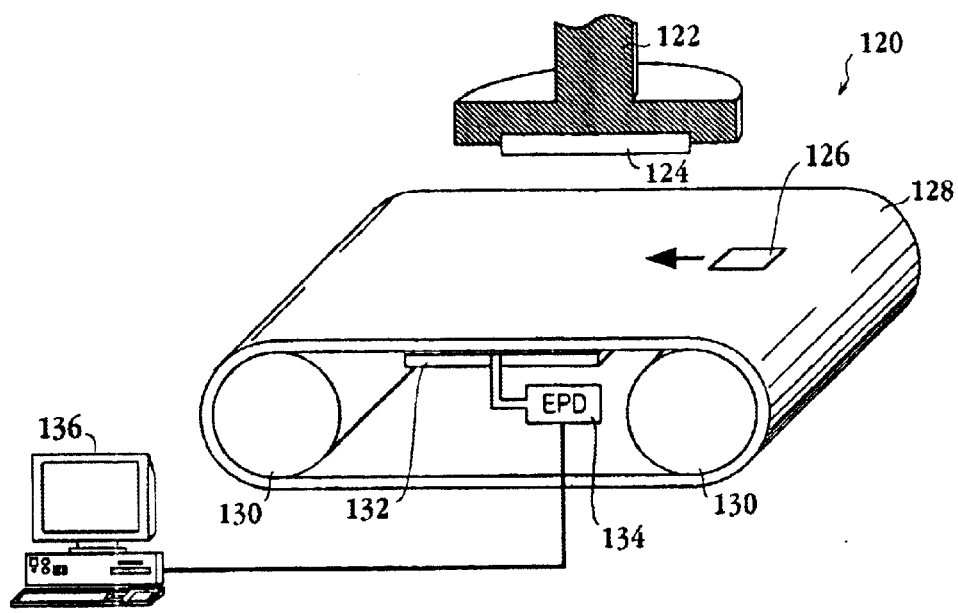
FIG. 5 is a simplified schematic diagram of a chemical mechanical planarization (CMP) system having an end point detector (EPD) in accordance with one embodiment of the invention.

FIG. 5 is a simplified schematic diagram of a chemical mechanical planarization (CMP) system having an end point detector (EPD) in accordance with one embodiment of the invention. CMP system 120 includes wafer carrier 122 supporting semiconductor substrate 124, which is disposed over CMP belt 128. Air bearing platen 132 is located on the underside of CMP belt 128. EPD 134 is located under air bearing platen 132 such that an optical pathway exists between EPD 134 through CMP belt 128 to semiconductor substrate 124. One skilled in the art will appreciate that EPD 134 includes an emitter for generating a light intensity and a receiver for receiving reflected light reflected spectra from the generated light. The optical pathway is enabled once every rotation of CMP belt 128 through window 126 disposed within CMP belt 128. CMP belt 128 is driven around rollers 130. EPD 134 is in communication with computer 136. It should be appreciated that while CMP system 120 is shown as a belt system, the invention described herein can also be applied to a rotary CMP system. Furthermore, EPD 134 can also be incorporated in other semiconductor manufacturing operations requiring thickness measurement, such as etch applications.

Still referring to FIG. 5, in one embodiment, once per rotation of belt 128 EPD 134 takes a shot of the wafer surface being planarized through window 126. It should be appreciated that wafer and semiconductor substrate are interchangeable, as used herein. As mentioned with reference to FIG. 1, a single shot can determine the trench depth. Alternatively, two shots can be used to determine a film thickness of a film on the semiconductor substrate. The spectra detected by EPD 134 is normalized and then the fitting procedure is applied. The found fitting curve defines the variables needed to determine the thickness of the trench at the point in time when the shot was taken or the thickness of the film when the difference between shots is used. In one embodiment, where the difference between the two reflectant spectra is used to determine a film thickness, the best fitting curve is found based on a slope fitting criterion. That is, the algorithm for finding the best fitting curve includes a slope fitting component. It should be appreciated that computer 136 is configured to execute the algorithm for finding the best fitting curve.

Figure 6:
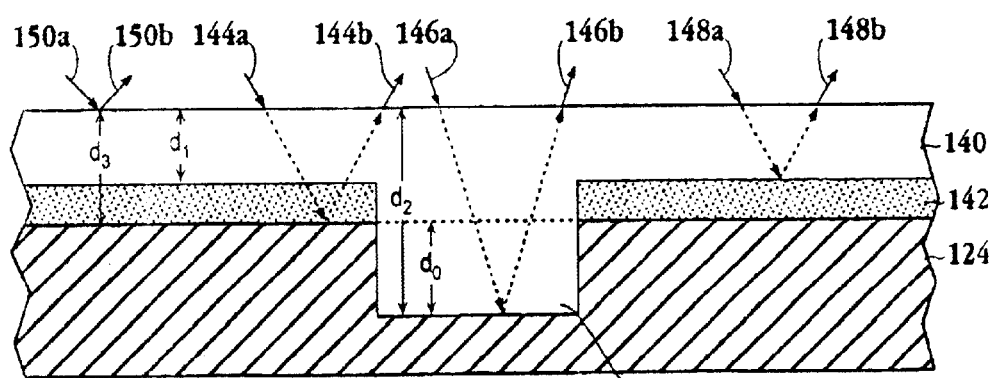
FIG. 6 is an enlarged simplified schematic diagram of a cross sectional view of a semiconductor substrate and the paths of light rays in multiple reflections from the various layers disposed on the semiconductor substrate in accordance with one embodiment of the invention.

FIG. 6 is an enlarged simplified schematic diagram of a cross sectional view of a semiconductor substrate and the paths of light rays in multiple reflections from the various layers disposed on the semiconductor substrate in accordance with one embodiment of the invention. Layer 140 is disposed over layer 142, which in turn is disposed over substrate 124. In one embodiment with respect to shallow trench isolation (STI), layer 140 is a silicon oxide layer, layer 142 is a silicon nitride layer disposed over silicon substrate 124. Reflectant spectra 144b, 146b, 148b and 150b are generated from incident light 144a, 146a, 148a and 150a, respectively. Thus, each layer disposed on the silicon substrate generates a portion of the reflectant spectra. However, the reflectant spectra is dominated by reflectant 144b and 146b from the silicon substrate. Thus, by comparing two shots taken at different time points, the interference generated from light rays from layer 140 having thickness d1, layer 142 having thickness d2-d1 and layer 143 having thickness d3 is taken into consideration, and the best fitting curve can be found. Therefore, the trench oxide thickness represented by distance d3 can be calculated from the differences between successive or different shots according to the function discussed above, as thickness d3 is decreasing from the planarization operation. It should be appreciated that an algorithm comparing the curve of the actual signal to a best fitting curve can be used here. In one embodiment, once thickness d3 reaches a predetermined thickness, the process can be stopped as the end point has been reached. It should be appreciated that while the embodiments described herein refer to a CMP system, the invention is also applicable to other semiconductor manufacturing operations that require the thickness to be measured such as etch applications.

Figure 7:
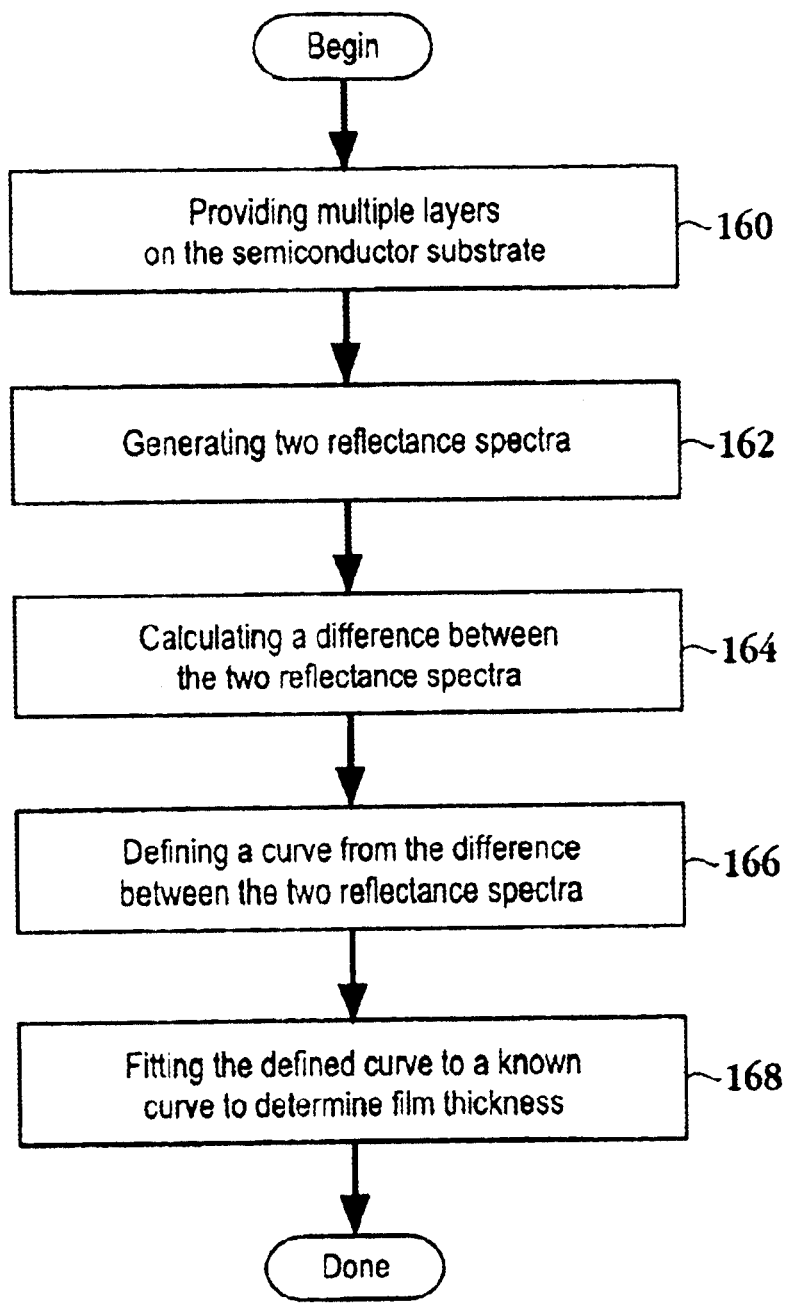
FIG. 7 is a flowchart of the method operations for determining a thickness of a film disposed on a semiconductor substrate in accordance with one embodiment of the invention.

FIG. 7 is a flowchart of the method operations for determining a thickness of a film disposed on a semiconductor substrate in accordance with one embodiment of the invention. The method initiates with operation 160 where multiple layers on a semiconductor substrate are provided. In one embodiment the multiple layers are associated with shallow trench isolation (STI) technology. The method then advances to operation 162 where two reflectance spectra, i.e., two shots, are generated. The reflectance spectra is generated from a light beam of a certain intensity directed toward the surface of the semiconductor substrate in one embodiment. Here, the light beam is reflected from the surface of the multiple layers and the reflected spectra from each of the multiple layers are captured by a detector. The method then proceeds to operation 164 where a difference between the two reflectance spectra is calculated. In one embodiment, the difference between the two reflectance spectra allows for the cancellation of unknown terms so that the functions discussed above can be simplified. That is, the multiple parameters can be reduced by using the difference of two shots when determining the thickness of a film. In another embodiment, a trench depth can be determined from one of the two reflectance spectra.

The method of FIG. 7 then moves to operation 166 where the difference between the two reflectance spectra is used to define a curve. In one embodiment, the curve is a sinusoidal curve. Here, the sinusoidal curve is approximated by a sine based function which can be represented by the following function $$S(v, dl) \approx a * \sum_{j=1}^{k} * \sin[2 * \pi * 2 * (nl * dl + \alpha_j) * v],$$

The method then advances to operation 168 where the curve of the actual reflectance spectra approximated by best fitting curve to determine a film thickness. In one embodiment, the film thickness is less than about 600 nm. It should be appreciated that the parameters associated with best fit curves have been identified. Accordingly, once the best fitting curve has been identified the film thickness is known. In one embodiment, a general purpose computer can execute the algorithm.

In another embodiment of the invention, one of the two reflectance spectra generated in operation 162 can be used to determine a trench depth as described above with respect to FIG. 1. Here, one of the two reflectance spectra is used as a real reflectance spectrum. The real spectrum curve is then fitted by best fitting solution using minimum squares criterion. As discussed above with respect to the found sine based curves, the parameters associated with each of the found cosine based curves have been identified. Thus, once the best fitting cosine based curve has been identified, the trench depth can be approximated. It should be appreciated that only one shot is necessary here. In one embodiment, a cosine based function generates the values for the cosine based curve. For example, the cosine based function for approximating the trench depth is:

$\cos(2\pi * 2n_1 * d_0 * v)$ in one embodiment.

Furthermore, the method described herein can be applied to determine an endpoint of a semiconductor fabrication process that removes a layer or layers from the semiconductor substrate, such as a CMP process, an etch process, etc.

In summary, the present invention provides for the determination of an endpoint of a semiconductor fabrication process, such as a CMP or an etch process, through the cancellation of interference between inner layer boundaries by considering differences between spectra of different shots rather than restoring the spectra. The invention has been described herein in terms of several exemplary embodiments. Other embodiments of the invention will be apparent to those skilled in the art from consideration of the specification and practice of the invention. The embodiments and preferred features described above should be considered exemplary, with the invention being defined by the appended claims.

What is claimed is:

1. A method for determining a film thickness in a semiconductor substrate, comprising:
   providing multiple layers on the semiconductor substrate;
   generating two reflectance spectra, each of the two reflectance spectra associated with different time periods;
   calculating a difference between the two reflectance spectra;
   defining a curve from the difference between the two reflectance spectra; and
   fitting the defined curve to a best fitting solution to determine the film thickness.

2. The method of claim 1, wherein the defined curve and the best fitting solution are of a sinusoidal shape.

3. The method of claim 1, wherein the method operation of fitting the defined curve to a best fitting solution to determine the film thickness further includes:
   determining a best fit between the defined curve and the best fitting solution based on a slope fitting criterion.

4. The method of claim 1, further including:
   determining a trench depth of a trench within the semiconductor substrate with one of the two reflectance spectra.

5. The method of claim 4, wherein the method operation of determining a trench depth of a trench within the semiconductor substrate with one of the two reflectance spectra includes:
   defining a curve from the one of the two reflectance spectra; and
   fitting the curve to a found cosine based curve to determine the trench depth.

6. The method of claim 5, wherein the cosine based curve is defined by a cosine function, the cosine function being $\cos(2\pi * 2n_1 * d_0 * v)$, wherein $n_1$ is an index of refraction for a first layer, $d_0$ is a trench depth, and $v$ is a wave number.

7. The method of claim 1, wherein the multiple layers include a silicon oxide layer disposed over a silicon nitride layer, the silicon nitride layer disposed over a silicon substrate.

8. The method of claim 1, wherein the two reflectance spectra are generated during one of a chemical mechanical planarization operation and an etch operation.

9. The method of claim 1, wherein the two reflectance spectra includes a dominant reflectance spectra reflected from a trench of a silicon substrate.

10. The method of claim 1, wherein each reflectance spectra is associated with an intensity.

11. The method of claim 1, wherein the film thickness is less than about 600 nanometers.

12. An endpoint detection system, comprising:
    a detector including;
    an emitter for generating light pulses having an intensity at periodic time periods;
    a receiver for measuring a reflected light spectrum from two of the light pulses; and
    a controller in communication with the detector, the controller configured to generate a curve for the two reflected light spectrum, the controller configured to calculate a difference between the two reflected light spectrum, the controller further configured to define a curve from the difference between the two reflected light.

13. The end point detection system of claim 12, wherein the controller is further configured to execute a best fitting algorithm to generate the curve corresponding to the difference between the two reflected light spectrum.

14. The end point detection system of claim 12, wherein the reflected light spectrum is reflected from a surface of a semiconductor substrate having multiple layers disposed thereon.

15. A chemical mechanical planarization (CMP) system, the system comprising:
    a polishing surface having a window defined therethrough;
    a carrier configured to support a semiconductor substrate, the carrier further configured to force a surface of the semiconductor substrate against the polishing surface;
    an endpoint detector disposed on an underside of the polishing surface, the endpoint detector configured to receive a reflected light signal from the surface of the semiconductor substrate, the endpoint detector including;
    an emitter for periodically generating an intensity of light;
    a receiver for measuring a reflected light spectrum from each intensity of light periodically generated; and
    a controller in communication with the end point detector, the controller configured to generate a curve by calculating a difference between the reflected light spectrum from a first generated intensity of light and a second generated intensity of light and applying a best fitting algorithm to the difference.

16. The CMP system of claim 15, wherein the controller is further configured to terminate a CMP process when a predetermined thickness of the semiconductor substrate is obtained.

17. The CMP system of claim 15, wherein the controller determines which of a plurality of found curves corresponds most closely to the curve.

18. The CMP system of claim 15, wherein the function approximating the sinusoidal based curve is represented as $$a * \sum_{j=1}^{k} \sin[2*\pi*2*(n_1*d_1 + \alpha_j)*v],$$

wherein $n_1$ an index of refraction for a first layer, $d_1$ represents a thickness of the first surface, $\alpha_j = n_j(d_j - d_1)$, and $v$ is a wave number.

19. The end point detection system of claim 12, wherein the two of the light pulses are successive light pulses.

* * * * *